March 23, 1965 J. K. KNOX-SEITH 3,175,127

MATRIX SWITCH

Filed Oct. 29, 1962 3 Sheets-Sheet 1

INVENTOR.

JOHN K. KNOX-SEITH

BY John F Lawler

ATTORNEY

March 23, 1965 J. K. KNOX-SEITH 3,175,127

MATRIX SWITCH

Filed Oct. 29, 1962 3 Sheets-Sheet 2

INVENTOR.
JOHN K. KNOX-SEITH

BY John F. Rawley
ATTORNEY

MATRIX SWITCH

Filed Oct. 29, 1962

INVENTOR.
JOHN K. KNOX-SEITH
BY John F Lawler
ATTORNEY

United States Patent Office 3,175,127

Patented Mar. 23, 1965

3,175,127

MATRIX SWITCH

John K. Knox-Seith, Palo Alto, Calif., assignor to Sylvania Electric Products Inc., a corporation of Delaware Filed Oct. 29, 1962, Ser. No. 233,793
7 Claims. (Cl. 317—101)

This invention relates to circuit controlling devices and more particularly to a switching device for establishing connections between electrical circuits transmitting signals at radio frequencies. For convenience, such a switching device will hereinafter be designated as a matrix switching device or a matrix switch.

Matrix switches are used to establish electrical connection among various circuits selected from a plurality of electrical groups. For example, in a communication system having first and second groups of circuits of eight lines each, a matrix switch enables any of the eight lines in the first group to be connected to any line in the second group.

Advances in the electronic science have produced applications requiring broadband matrix switches capable of operation at radio frequencies. Two examples are phased array antenna systems employing matrix switches for steerage of the major lobe of the antenna pattern and telephone communication systems wherein blocks of telephone channels are switched at carrier frequencies.

However, experience has shown that matrix switches constructed by the usual methods; i.e., an array of conductors arranged as grid lines of a rectangular coordinate system, do not provide satisfactory operation in such applications. It is believed this unsatisfactory operation results from a prohibitively high voltage standing wave ratio (VSWR) of each switching path due to signal reflections attributable to the length of unused line beyond the cross point of the conductors. Also such switches have high cross talk, i.e., cross coupling of signals traversing different paths; are bulky and are costly to manufacture and maintain because of the close proximity of assembled parts.

A general object of the invention is the provision of a compact matrix switch which operates efficiently at radio frequencies.

Another object of the invention is the provision of a matrix switch which is capable of selectively coupling high frequency energy between an input terminal and an output terminal selected from a multiplicity of output terminals while simultaneously selectively transferring energy between a second pair of selected input and output terminals.

Still another object of the invention is the provision of a matrix switch having a low voltage standing wave ratio, low cross talk between paths and equalized path lengths between a plurality of input and output terminals.

Another object of the invention is the provision of a simple to manufacture and maintain matrix switch employing transfer lines which acts as a plurality of transmission lines of similar electrical length for selectively coupling high frequency energy between a plurality of input and output terminals.

In the attainment of the foregoing objects, the matrix switch of the present invention features the use of a plurality of interlocking circuit boards and shielding plates acting as the center and ground conductors of sections of transmission lines. The boards and plates are rectangularly shaped and together constitute grid lines of a rectangular coordinate system. A first group of plates and boards, called an ordinate group, are stacked in parallel planes and are attached at their edges to a second group of boards and plates, called an abscissa group, oriented at an angle of 90 degrees with respect to the first group. On each board of the first group is a line acting as a center conductor having an input arm connected to an input terminal and a multiplicity of first transfer arms resembling the ribs of a fan connected in series with gating diodes for selectively opening the arm for signal transmission. The boards of the second group have similarly formed fan-like transfer arms in series with similar gating diodes, these arms terminating at their divergent ends along the board edges adjacent to the first group of boards and converging at their opposite end to an output arm which is connected to an output terminal. The several arms on one board of the first group connect respectively to one such arm on each of the several boards of the second group.

The stacked array of boards and shielding plates and the fan-shaped arrangement of the transfer arms simplify the manufacture of the switch, reduce the cross talk and VSWR of the switching paths, and substantially equalize the length of each conduction path from input to output terminals without the need for external equalization lines.

Other objects of the invention will become apparent from the following description of a preferred embodiment thereof, reference being had to the accompanying drawings in which.

Figure 1:
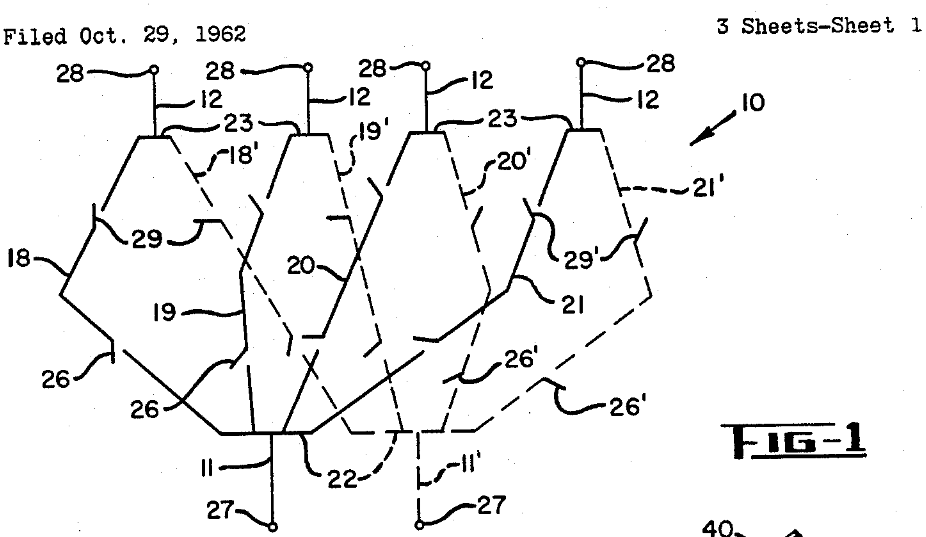
FIGURE 1 is a partial schematic diagram of the matrix switch embodying the invention.

Referring to FIGURE 1, there is shown a schematic representation of a matrix switch 10 comprising double sections of transmission lines, one transmission line being shown in solid line and one in dotted line having primed reference characters related to common elements. Basically these lines act as sections of transmission lines having first arms 11 and 11' and four transfer arms 18, 19, 20, and 21; and 18', 19', 20', and 21'. The respective transfer arms of the two lines are joined to second arms 12 at first stub junctions 23 and make electrical connection with first arms 11 and 11' at second stub junctions 22. Each of the transfer arms is discontinuous so as to present an open circuit to radio frequency energy transmitted from input terminals 27 and to output terminals 28. However, any open circuit path may be selectively closed by exciting respective first switching elements 26 and 26' and second switching elements 29 and 29' in the transfer arms. The distance between stub junctions 22 and 23 and switching elements 26, 26', 29, and 29' is as short as possible in terms of signal wave length for which the switch is intended in order to minimize line mismatch. This is necessary in order that the impedance at the junctions as seen by the input terminal is essentially the characteristic impedance of the transmission line.

Figure 2:
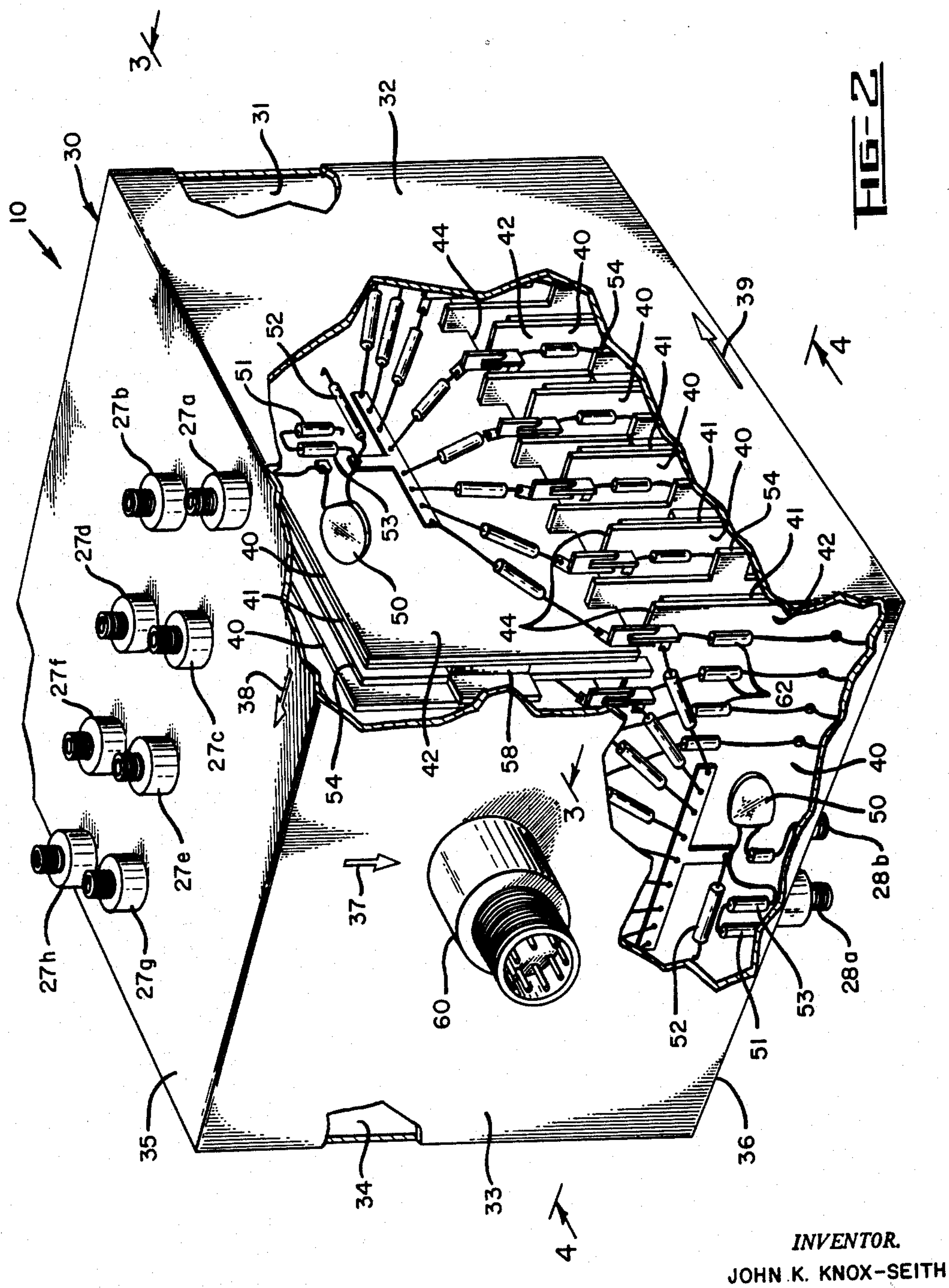
FIGURE 2 is a perspective view, partially cut away, of the matrix switch of FIGURE 1 illustrating its construction and assembly.

The switch schematically illustrated in FIGURE 1 is implemented by a three-dimensional array of sections of transmission lines in the manner illustrated in FIGURE 2.

A metallic housing 30 consists of side walls 31, 32, 33, and 34 and broad walls 35 and 36 and encloses a plurality of dielectric printed circuit boards 40. These boards are rectangular in cross section and include a subsidiary ground plate 41 on a rearward surface and a forward surface 42 for supporting the center conductors of the lines.

These boards are stacked together in an array which resembles grid lines of a rectangular coordinate system when viewed in the direction of arrow 37, FIGURE 2, and provide support of the center conductors in a minimum spacial configuration. Specifically, boards are stacked together and form two groups. The upper group, as viewed, hereinafter called abscissa or "A" boards, are parallel with side walls 32 and 34 and aligned in a row in the direction of arrow 38. Boards forming the lower group, hereinafter called ordinate or "O" boards, are arranged parallel to side walls 31 and 33 and are aligned in a row in the direction of arrow 39. The row of "A" boards is stacked on the row of "O" boards with the planes of the "A" boards perpendicular to the planes of the "O" boards and with abutting edges 44 of either "A" or "O" boards perpendicular to the planes of the other boards.

Figure 3:
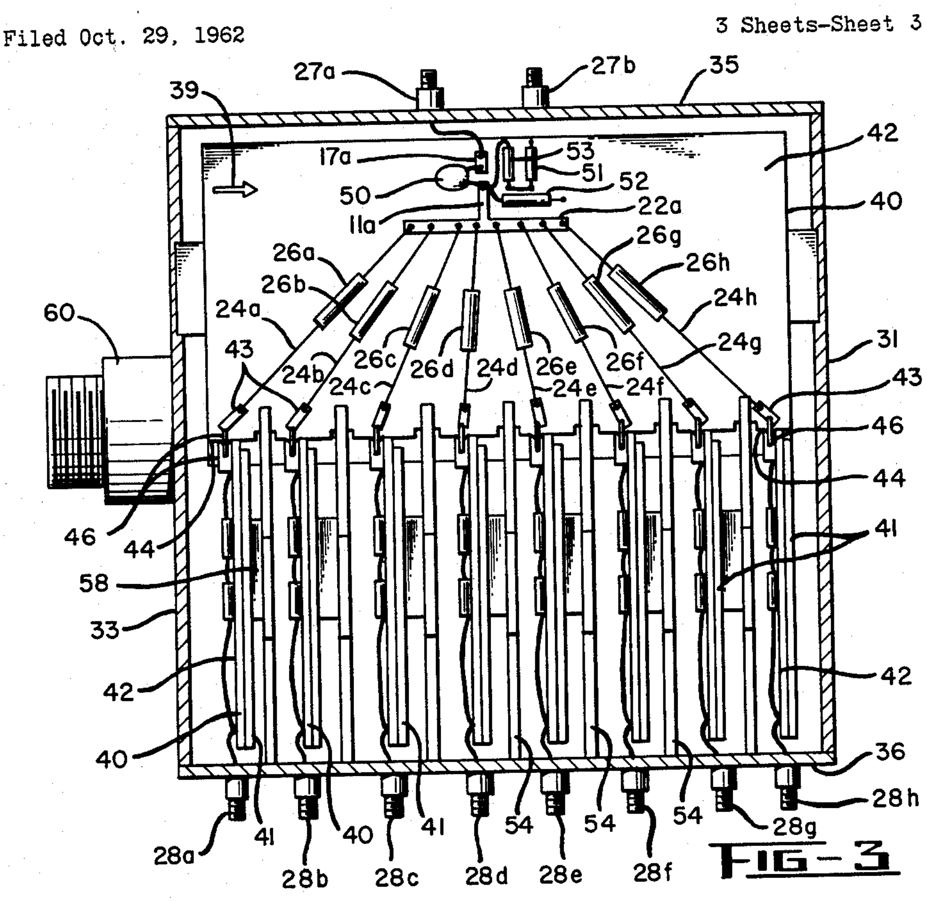
FIGURE 3 is a cross-sectional view of one group of circuit boards of the matrix switch taken along line 3—3 of FIGURE 2 illustrating the arrangement of lines of the switch.
Figure 4:
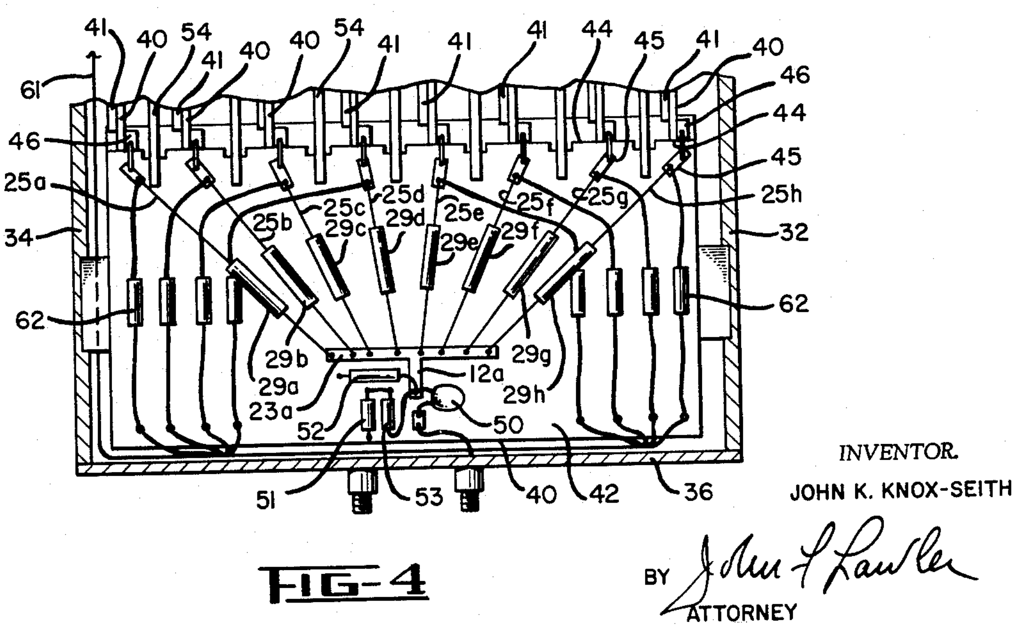
FIGURE 4 is a partial cross-sectional view of a second group of circuit boards of the switch taken along line 4—4 of FIGURE 2.

Center conductors of the transmission line are in the form of conducting materials bonded to the broad surfaces 42 of the boards as shown in FIGURES 3 and 4. On each upper "A" board, a portion of the center conductor is arranged in a partial T configuration having an arm 11*a* attached to a stub junction 22*a*. On each lower "O" board, the center conductor is arranged in a similar manner having a first arm 12*a* attached to a stub junction 23*a*. Adjacent to the stub junctions, a short section of each center conductor is removed and replaced by a diode switching element comprising diodes 26*a*–26*h*, inclusive, and diodes 29*a*–29*h*, inclusive, for selectively switching signals through the matrix. Diodes 26*a*–26*h* attach between stub junction 22*a* and strip portion 43 of the "A" boards; diodes 29*a*–29*h*, inclusive, attach between stub junctions 23*a* and strip portions 45 of the "O" boards. The leads of these diodes constitute the transfer arms of the transmission lines which are designated by numbers 24*a*–24*h*, inclusive, on the "A" boards, and by numbers 25*a*–25*h*, inclusive, on the "O" boards.

As shown in FIGURES 3 and 4, the spacing between adjacent transfer arms in the direction of arrow 39 is greater near abutting edge 44 of the "A" and "O" boards than at the attaching junction of the arms; i.e., at respective stub junctions 22*a* and 23*a*. Thus, the transfer arms 24*a*–24*h* project outwardly and downward from the junction 22*a* on the "A" boards as shown in FIGURE 3; on each "O" board, FIGURE 4, the transfer arms 25*a*–25*h* project outward and upward from the junction 23*a*. Consequently, a fan-shaped mounting configuration is described on each board which in operation minimizes differences in the length of respective transfer arms while minimizing the inactive stub length connected to the active path.

Electrical connection between strip portions 43 and 45 on the "A" and "O" boards is achieved by pins 46. As shown in detail in FIGURE 5, each pin is rectangular in cross section and attaches by an edge to respective "A" and "O" boards in rigid contact with the strip portions of the transfer arms. The opposite end of each pin extends beyond the abutting edge 44 and makes releasable engagement with a mating pin oriented normal thereto attached to a respective opposite "A" or "O" board. Electrical contact between parts is achieved by fingers 47 formed in the mating portions of the pins which bind against the edges of the fingers of the opposite pin. Each finger is slightly undercut near its end so that electrical contact at the pin joint is assured without the need for soldering or welding. This provides for easier disassembly of the switch in the event repairs are necessary. Each board is also formed with a series of notches 48 which are provided in order that shield plates may extend in the region adjacent to the pins and shield against stray electromagnetic energy. Each notch is defined by vertical side walls 49*a* and an edge 49*b*.

Arms 11*a* and 12*a* of the center conductors also have sections thereof removed such as shown in FIGURES 3 and 4 to form gaps which lie short distances from stub junctions 22*a* and 23*a*. Electrical connection between the end of the gaps is made by coupling capacitors 50 which, in part, form respective diode gating circuits which selectively close the transfer arms. Additional components of such circuits attach between the severed end portions of the arms 11*a* and 12*a* and the ground plate 41 and include resistors 51 and 52 and inductors 53, each resistor 52 attaching between the arm and the plate and shunting the serially connected inductor 53 and resistor 51.

Located parallel with the groups of boards are shield plates 54, see FIGURE 2. These plates are the ground plane conductors of the line and also prevent inductive coupling between the paths of the switch. Plates forming the upper group, hereinafter called abscissa or "A" plates, are parallel to the "A" boards and are aligned in a row in the direction of arrow 38. Plates forming the lower group, hereinafter called ordinate or "O" plates, are aligned parallel to the "O" boards and are aligned in a row in the direction of arrow 39.

Figures 5, 6, 7:
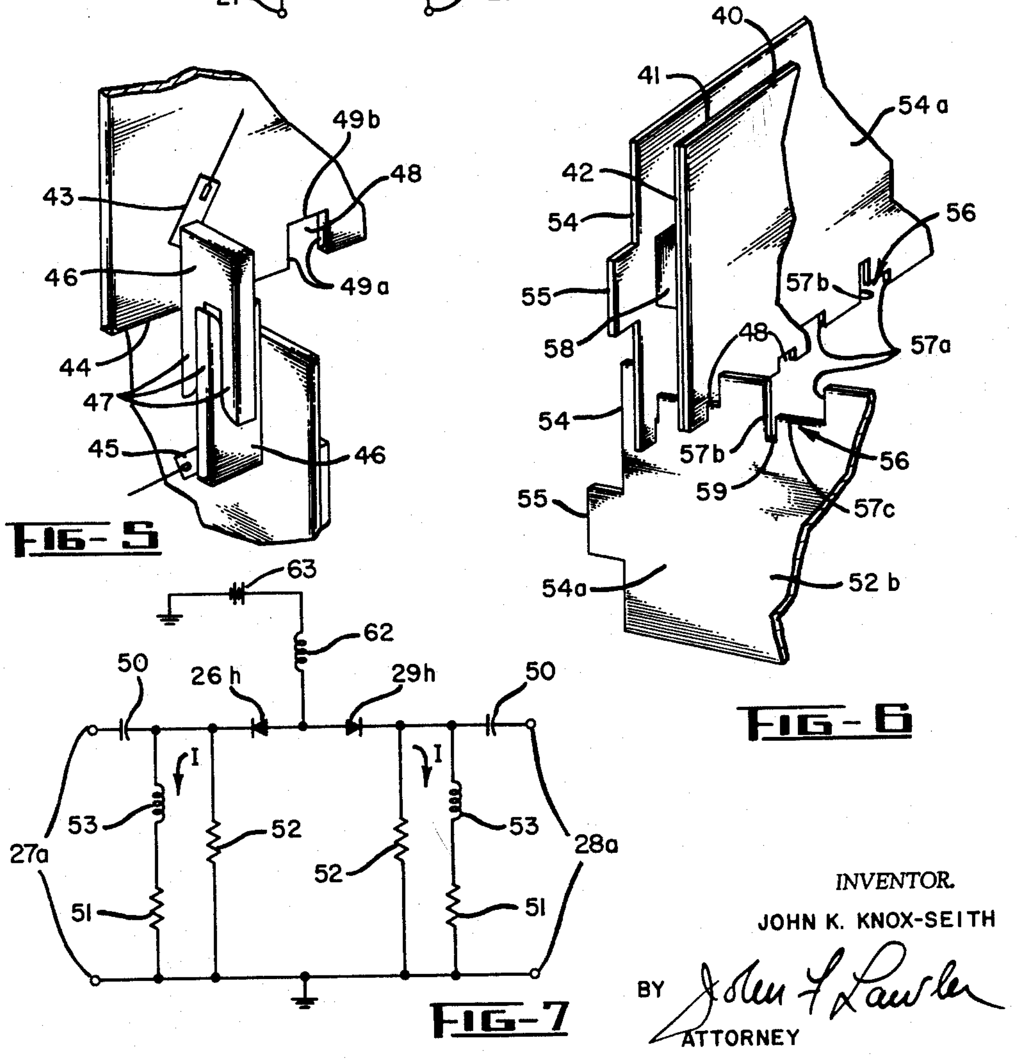
FIGURE 5 is an enlarged view of a mounting pin of the circuit boards of FIGURE 2.
FIGURE 6 is an enlarged view of the portion of the ground shields and circuit boards of FIGURE 2 illustrating the manner of attachment.
FIGURE 7 is a schematic circuit diagram of a single path of the matrix switch of FIGURE 2.

As shown best in FIGURE 6, each plate comprises a planar central section 54*a* of rectangular cross section and flanges 55 which extend from section 54*a* and attach to the walls of the housing. Notches 56 are formed at the edges of the central sections and include longitudinally spaced shoulders 57*a* and 57*b*, an edge part 57*c* and a cavity 59 defined between shoulder 57*b* and edge part 57*c*. The plates are joined together by permanently mating respective shoulders 57*a* and cavity 59 so that each cavity tightly grips the face of a plate of an opposite group to form a partial egg crate configuration.

The "A" and "O" boards are joined to the plates 54 using the notches 48 as guideways and are firmly spaced apart by blocks 58 located near the flanges of the plates. These blocks are rectangular in cross section and are located in slip fit contact with adjacent boards so that respective "A" boards are parallel with "A" plates and respective "O" boards are parallel with "O" plates.

Radio frequency energy is coupled into and from the switch by coaxial input connectors 27*a*–27*h*, inclusive, and coaxial output connectors 28*a*–28*h*, inclusive, as shown in FIGURES 2, 3, and 4. These connectors are located on the top and bottom walls 35 and 36 of the housing. The outer conductors of the connectors are electrically connected to respective terminals of the plates 54. The interior conductors of these connectors are respectively connected to corresponding termini of the center conductors; that is, the inner conductors of the couplers are electrically connected to respective ends of each center conductor line located on the "A" and "O" boards.

Switching of energy applied to any one of the input connectors 27*a*–27*h* to any circuit path through the switch is achieved by a diode gating circuit which includes a capacitor 50, an inductor 53, resistors 51 and 52 and a pair of the serial connected diodes provided from diodes 26*a*–26*h*, inclusive, on the "A" boards and diodes 29*a*–29*h* on the "O" boards. Actuation of each gate circuit occurs at the strip terminal 45 of the "O" boards connected to an outside energy source 63, shown schematically in FIGURE 7, by a D.C. connector 60 located on side wall 33 of the enclosure. Each pin of the connector is electrically connected to the terminal strip via lead 61 and inductor 62. These pins may also be electrically interconnected to other strip terminals in separate boards to decrease the number of pins required for matrix operation.

The operation of the switch will be understood by following a signal through the matrix switch. Signals applied to any input terminal may follow one of the eight paths connected to the input terminal since FIGURE 2 illustrates an 8 x 8 matrix switch. A choice of path is determined by the conducting states of diodes **26*a*–26*h* on the "A" boards and by diodes 29*a*–29*h*** on the "O" boards.

Initially, all diodes are back biased to well beyond the peak signal level to present a large dynamic impedance to the applied signal (open circuit condition). Application of a positive D.C. potential to a pair of diodes causes the diodes to conduct and direct current flows through the respective transfer arms of the "A" and "O" boards and respective resistors 51 to the ground plane of the line. This opens the designated line for signal transmission.

Referring specifically to FIGURE 3, consider operations of the matrix switch for transmission of a radio frequency signal from input terminal **27*a* to output terminal 28*a*. The center conductors of these terminals electrically connect to center conductors of respective "A" and "O" boards. When D.C. potential is applied to diodes 26*a* and 29*a* of these respective boards, the diodes conduct. As shown in the circuit diagram of FIGURE 7, the current flow I is blocked by capacitors 50 from the RF circuits connected to respective termini of the line and is maintained at a given level almost exclusively by resistor 51 in that very little current flows through shunting resistors 52 because of its high resistance level relative to that of resistor 51**.

The radio frequency energy propagating from the input terminal **27*a* sees the open circuits at stub junction 22*a* in the transfer arms 24*b*–24*h* because of the large impedance introduced by the diodes 26*b*–26*h*. The path designated by diodes 26*a* and 29*a* present the characteristic impedance of the line with the dynamic impedance of the diodes 26*h* and 29*h* being minimized by connecting these diodes in parallel with resistors 52, see FIGURE 7. The signal propagates unimpeded through the transfer arms 24*a* and 25*a* to output terminal 28*a*, the signal being blocked from resistor 51 and from the D.C. biasing source by respective inductors 53 and 62** connected in series with these circuit components.

When input terminal **27*a* is connected to any output terminal 28*a*–28*h*, the impedance conditions of the line as seen from input terminal 27*a* will differ only slightly from the characteristic impedance of the line. This slight deviation from the characteristic impedance is due to the change in the length of stub junctions 22*a* and 23*a*** beyond the attachment points of the transfer arms and is minimized by the fan-shaped mounting configuration of the arms.

Note also that the slight differences in the physical lengths of the switching paths formed between input tedminal **27*a* and output terminals 28*a*–28*h* are also minimized by the fan-shaped mounting configuration. The only variations in such path lengths lie in the differing lengths of transfer arms 24*a*–24*h* connected to diodes 26*a*–26*h* of the "A" boards since the transfer arms on the "O" boards connected to the arms 24*a*–24*h*** are equal. Thus, the differences in the phase shift of signals traversing such paths are small.

Two signals simultaneously applied to two input terminals are capable of being simultaneously transmitted by switch 10. For example, for two signals applied to the terminals **27*a* and 27*b*, FIGURE 3, in addition to the path opened from the input terminal 27*a* to output terminal 28*a* as described above (closed circuit condition), a second path can be closed to allow the signal to pass from input terminal 27*b* to output terminal 28*b*. Since the paths are electrically isolated by shields 54**, cross coupling of the signals is small.

The switch according to FIGURE 2 (8 x 8 matrix switch) has been constructed and found to have an input voltage standing wave ratio under 1.35:1 over a frequency range of 2 to 50 megacycles. Over a similar range of frequencies, the insertion loss between the termini of any path has been found to be less than .8 db, and a cross talk rejection between any two adjacent paths has been found to be greater than 60 db. Signal delay between a signal input and any two possible outputs has been found to be less than .25 nanosecond over a 6 to 30 megacycle range of frequencies.

Additional parameters of importance for the switch include the following dimensions:

| Item | Dimension, inches |
|---|---|
| Item—Enclosure **30**: | |
| Length | 7 |
| Height | 5 |
| Width | 5 |
| Item—Boards **40**: | |
| Length | 4½ |
| Height | 2½ |
| Thickness | ⅛ |
| Item—Plates **54**: | |
| Length (nominal) | 5 |
| Height | 3 |
| Thickness | ⅛ |

From the foregoing it can be seen that applicant has achieved the above stated objects of providing a multipath radio frequency switch of simple design and small size, the paths being termini within the switch being independently operative, of low VSWR, and of substantially equal length. Although there has been described what for some applications is considered a preferred embodiment of the invention, various modifications will now be suggested to those skilled in the art. For example, transistor gates may be substituted for the diode gates.

What is claimed is:

1. A matrix switch comprising a plurality of plane dielectric boards arranged in first and second rows, said rows having axes, said boards in each row lying in spaced planes and being spaced apart along the axis of the row, said boards of one row being stacked on the board edges of the other row with the axes of said rows non-intersecting and extending at an angle to each other, a conducting plate disposed between and spaced adjacent to dielectric boards in each row, each board having a conductor with a first arm and a plurality of second arms electrically connected to the first arm, said first arm terminating at one edge of the board remote from the other row of boards, said second arms having substantially equal lengths and terminating at spaced locations along a second edge of the board adjacent to the other row of boards, a diode connected in series with each of said second arms and having two operating states for blocking or passing signals on the arm, diode bias voltage control means connected to each of said arms and operative to change the diode operating state, each second arm on a dielectric board in one row being electrically connected to a second arm on a board in the other row at the second edges of the boards, a coaxial input connector for each board in said first row having a center conductor connected to the first arm of the corresponding board in said first row and having an outer conductor electrically connected to the conducting plates of said first row, and a coaxial output connector for each board in said second row having a center conductor connected to the first conductor arm of the corresponding board in said second row and having an outer conductor electrically connected to the conducting plates of said second row.

2. A matrix switch comprising a plurality of plane dielectric boards arranged in first and second rows, said boards of one row being stacked on the board edges of the other row, a conducting plate disposed between adjacent dielectric boards in each row, each board having a conductor with a first arm and a plurality of second arms electrically connected to the first arm, said second arms having substantially equal lengths and terminating at spaced locations along an edge of the board adjacent to the other row of boards, electronic switch means with each of said second arms for blocking or passing signals on the arm, switch control means connected to each of said arms, each second arm in one row being electrically connected to a second arm on a board in the other row at the edges of the boards, an input connector for each board in said first row having a first conductor connected to the conductor first arm of the corresponding board in said first row and having a second conductor electrically connected to the conducting plates of said first row, and an output connector for each board in said second row having a first conductor connected to the first conductor arm of the corresponding board in said second row and having a second conductor electrically connected to the conducting plates of said second row.

3. In a matrix switch including a plurality of transmission lines for coupling a radio frequency signal between a source and a load selected from a multiplicity of sources and loads, a plurality of first flat metallic plates arranged in a row having a first axis, said plates lying in spaced parallel planes and being equally spaced apart along said axis, a plurality of second flat metallic plates arranged in a row having a second axis orthogonal to said first axis, said plates lying in spaced parallel planes and being equally spaced apart along the second axis, attaching means for connecting said first plates to said second plates, an edge of each plate of a row in contact with an adjacent edge of each perpendicularly oriented plate of the other row, a plurality of first dielectric boards arranged in a row having an axis colinear with said first axis of the row of first metallic plates, each board being equally spaced between and parallel to adjacently disposed first plates, a plurality of second dielectric boards arranged in a row having an axis colinear with said second axis of the row of second metallic plates, each board being equally spaced between and parallel to adjacently disposed second plates, center conductor means attached to each of said boards and comprising a first arm and a multiplicity of second transfer arms joined to said first arm and extending therefrom in a fan-shaped mounting configuration, said first arm terminating at one edge of the board remote from the other row of boards, said transfer arms terminating at spaced locations along a second edge of the board adjacent to the other row of boards and having sections removed to form gaps, connector means for electrically connecting said transfer arms of respective first and second boards at said second edge where a transfer arm of each first board connects to a transfer arm on said second board, a plurality of diodes in register with and connected between said gaps, a diode control voltage means in electrical contact with said diodes to change the conducting state of said diodes, capacitor means electrically connected to said first arms at the edge of the board remote from the other row of boards for isolating said current from said source and said load, resistor means electrically connected to the first arms at the edge remote from the other row of boards, inductor means electrically connected to said first and second arms, a plurality of first input couplers connected to respective signal sources having an inner conductor connected to the extremes of respective first arms of said first plurality of boards, and outer conductors connected to the extremities of respective first plates, and a plurality of second output couplers connected to respective boards having inner conductors connected to the extremities of first arms of the center conductors of said second plurality of boards and outer conductors connected to respective second plates.

4. The matrix switch in accordance with claim 3 wherein said attaching means for connecting the row of first plates to the row of second plates includes a plurality of notches in each plate having elongated slots which are in releasable connection with each perpendicularly oriented plate of the other row.

5. The matrix switch in accordance with claim 4 wherein said connector means for electrically connecting the transfer arms of the center conductor means include pin members attached at the second edges of the boards remote from the other row of boards.

6. In a matrix switch including a plurality of transmission lines for coupling a radio frequency signal between a source and load selected from a multiplicity of sources and loads, a plurality of first flat metallic plates arranged in a row and lying in spaced parallel planes, said plates comprising sections of the ground conductors of said transmission lines, a plurality of second flat metallic plates arranged in a row and lying in spaced parallel planes oriented perpendicular to the planes of the first plates, said plates comprising other sections of the ground conductors of said lines, means for attaching said first plates and second plates where an edge of each plate of the row is in contact with a portion of each plate in the other row, pluralities of first dielectric boards spaced between said first plates and parallel therewith, pluralities of second dielectric boards spaced between said second plates and parallel therewith, center conductor means attached to said first and second boards, said conductors means on said first boards having a first arm connected to respective signal sources at an edge remote from said other row of boards and a multiplicity of second transfer arms extending from said first arms in a fan-shaped mounting configuration and terminating at locations adjacent to the other row of boards, said center conductors of said second boards having a first arm connected to respective loads at an edge remote from said other row of boards, and a multiplicity of second transfer arms extending therefrom in a fan shaped mounting configuration and terminating at locations adjacent to the other row of boards; said transfer arms having sections removed to form gaps, connector means electrically connecting said transfer arms of respective first and second boards where transfer arms on said first boards are connected to a transfer arm on each of said second boards, respectively, and means for selectively closing said gaps including a plurality of diodes connected between said gaps whereby said signal can propagate from said source to said load.

7. A matrix switch including a plurality of transmission lines for coupling a radio frequency signal between a source and load selected from a multiplicity of sources and loads, a plurality of first flat metallic plates arranged in a row and lying in spaced parallel planes, a plurality of second flat metallic plates arranged in a row and lying in spaced parallel planes oriented perpendicular to the planes of the first planes, said second plates being in edge attachment with said first plates, pluralities of first and second dielectric boards arranged in rows, each of said first boards being spaced between adjacent first plates and parallel therewith, each of said second boards being spaced between adjacent second plates and parallel therewith, center conductors attached to said first and second boards, each of said conductors having a first arm and a multiplicity of second transfer arms extending from said first arms in a fan-shaped mounting configuration and terminating at locations adjacent to the other row of boards, said transfer arms having sections removed to form gaps, connector means for electrically connecting transfer arms of respective first and second boards, and means for selectively closing said gaps.

References Cited by the Examiner

UNITED STATES PATENTS

| | | | |
|---|---|---|---|
| 2,701,346 | 2/55 | Powell | 317—101 |
| 2,703,853 | 3/55 | Chrystie | 317—101 |
| 2,951,184 | 8/60 | Wyma | 339—17 |
| 2,955,236 | 10/60 | Luhn | 339—17 |

LARAMIE E. ASKIN, *Primary Examiner.*

JOHN F. BURNS, *Examiner.*